March 31, 1925.  1,532,068
E. OLSON
TRAP SETTER
Filed May 5, 1924  2 Sheets-Sheet 1
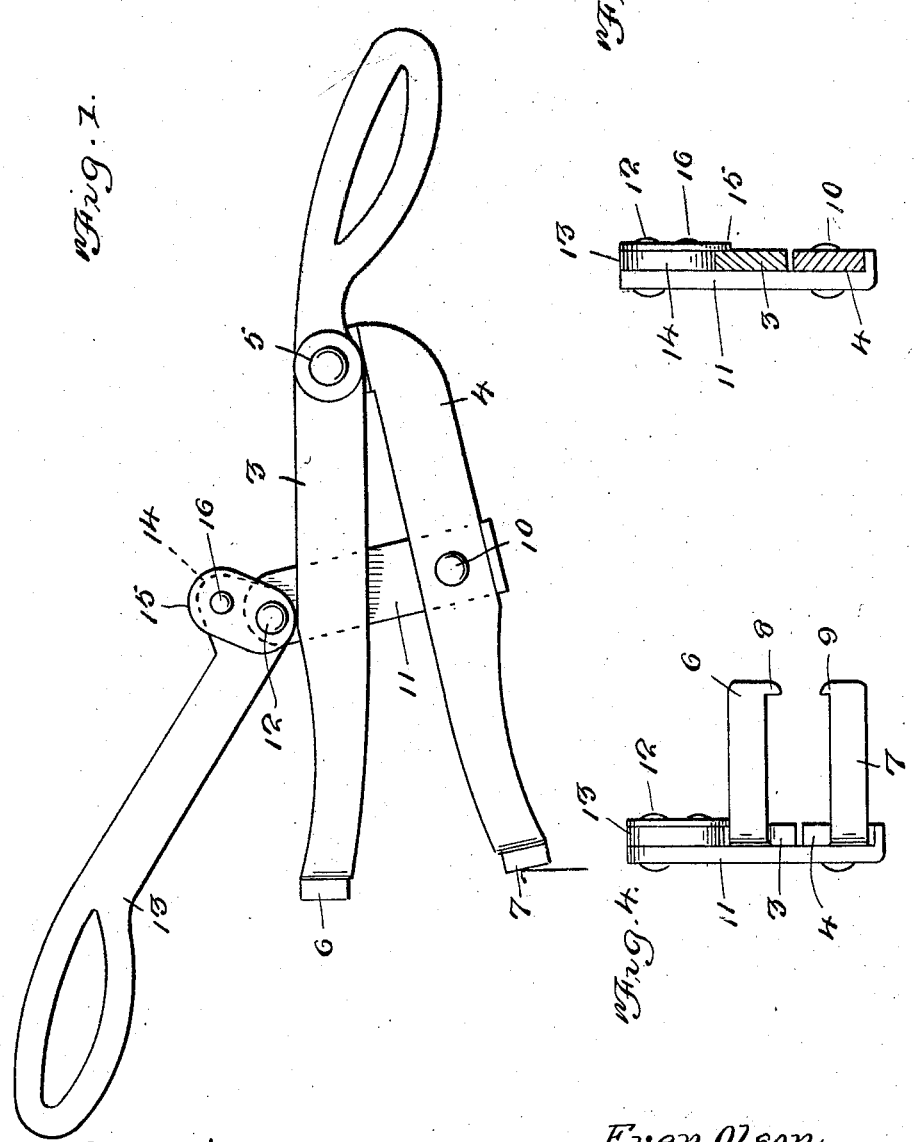
Even Olson
INVENTOR
BY Victor J. Evans
ATTORNEY

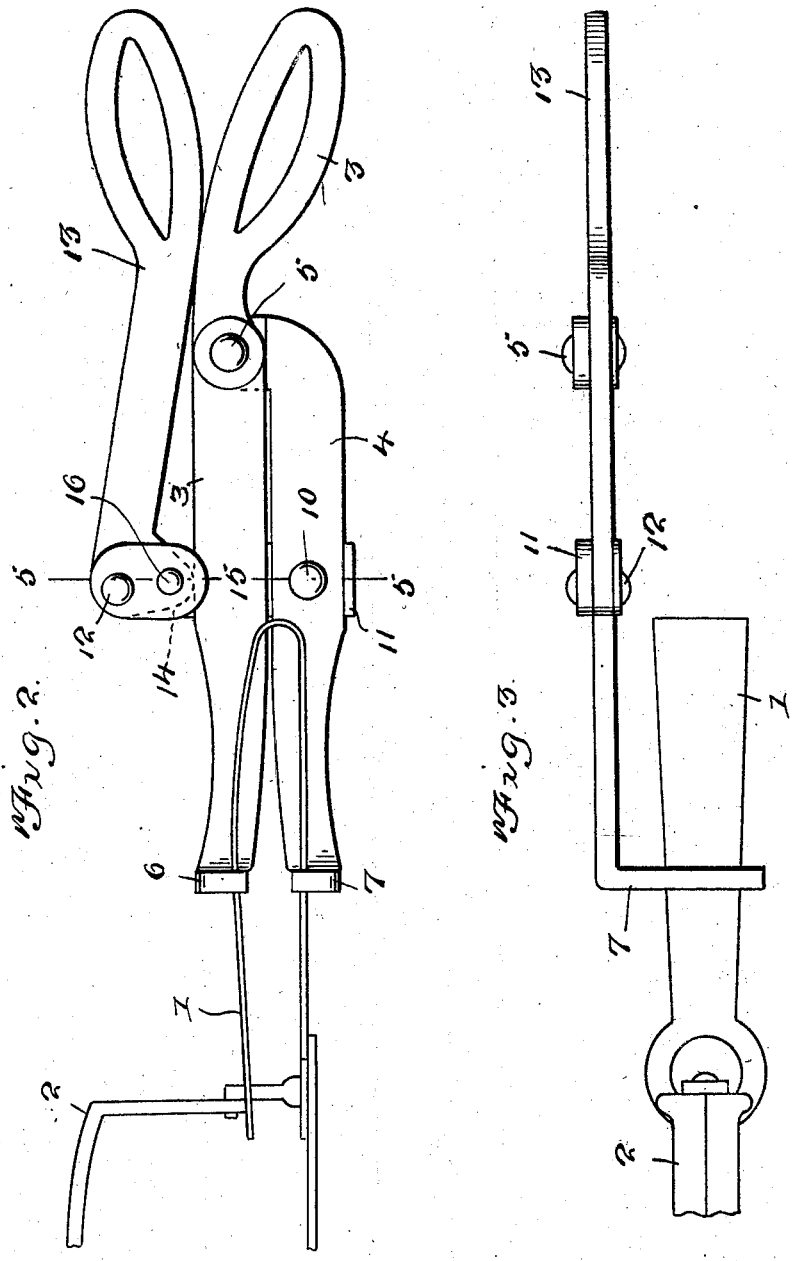

Patented Mar. 31, 1925.

1,532,068

UNITED STATES PATENT OFFICE.

EVEN OLSON, OF QUARTZBURG, IDAHO.

TRAP SETTER.

Application filed May 5, 1924. Serial No. 711,207.

*To all whom it may concern:*

Be it known that I, EVEN OLSON, a citizen of the United States, residing at Quartzburg, in the county of Boise and State of Idaho, have invented new and useful Improvements in Trap Setters, of which the following is a specification.

The object of this invention is the provision of means for compressing the two-arm springs of animal traps and for holding the said springs so compressed as to permit of the setting of the trap without liability of injury to the trapper.

To the attainment of the foregoing, the invention consists in the improvement as hereinafter described and definitely claimed.

In the drawings:—

Figure 1 is a side elevation of the improvement.

Figure 2 is a similar view, but showing the improvement in operative position.

Figure 3 is a top plan view of the device as illustrated in Figure 2.

Figure 4 is an end view of the improvement.

Figure 5 is a sectional view on the line 5—5 of Figure 2.

The danger to trappers in setting spring jaw influenced traps is well known, and with my improvement the traps can be set in an easier manner than heretofore known to be and with perfect safety.

In Figures 2 and 3 of the drawings, I have shown the spring 1 of an ordinary jaw trap 2 compressed and held compressed by the improvement.

The improvement contemplates the employment of two handle members 3 and 4 respectively. The handle member 3 is of a greater length than the handle member 4, the latter having an offset end which is pivoted to the handle 1, as indicated by the numeral 5. Each of the handle members have their outer ends formed with angularly disposed jaws 6 and 7 respectively, the outer corners at the confronting faces of the jaws being formed with projections in the nature of lugs 8 and 9.

Secured to the handle member 4, by means 10, there is a plate 11 which extends beyond the handle member 3. Pivoted, as at 12, to the outer end of the plate 11 there is a lever 13. The lever at its pivot end is offset in one direction to form a cam surface 14. Either integrally formed with the laterally extending cam end 14 of the lever 13 or secured on the outer face thereof there is a projecting ledge 15. In the showing of the drawings, the ledge is in the nature of a plate which is secured to the cam enlargement 14 by the pivot 12 and by a rivet 16. The ledge plate guides the cam over the handle member 3, as the same contacts with the outer side of the said handle member.

The jaw ends 6 and 7 of the handle members 3 and 4 are disposed to engage with the upper and lower arms of the U-spring 1 of the trap 2. When so arranged the lever 13 is in the position illustrated in Figure 1. The lever is thereafter swung so that its cam end or surface 14 will ride over the outer edge of the handle 3, swinging the said handle on the pivot 14 toward the handle 4, and causing the jaws 6 and 7 to compress the arms of the spring 1. The lever is locked in closed position as the same is eccentrically pivoted to the plate 11.

Having described the invention, I claim:—

A means for compressing the arms of a U-spring for a jaw animal trap, comprising two handle members, one of which being shorter than the other and formed with an offset portion which is pivotally secured to the other handle, each of said handle members having their outer ends offset in the same direction to provide jaws, and each of the jaws having its outer corner at its confronting end provided with a lug, a plate secured on the shorter handle member and extending beyond the longer handle member, a lever eccentrically pivoted to the outer end of the plate, said lever having a cam extension at its pivot end designed to ride over the outer edge of the longer handle member to swing the same toward the shorter handle member and bring the jaws of the handle members toward each other, and a ledge projecting from the outer edge of the cam end of the lever for guiding the longer handle member toward the shorter handle member.

In testimony whereof I affix my signature.

EVEN OLSON.